Oct. 10, 1944.                F. H. DALRYMPLE                2,360,209
                            DUPLEX CHAIN CONVEYER
                            Filed Dec. 21, 1942             6 Sheets-Sheet 1
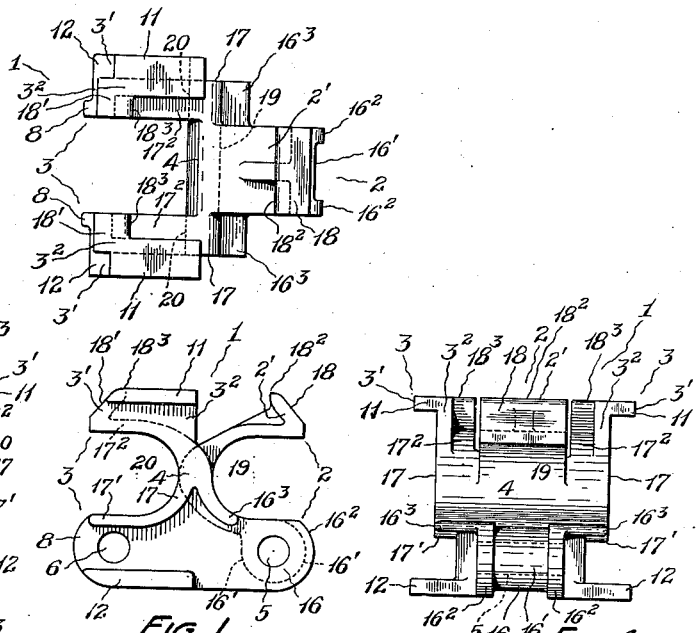
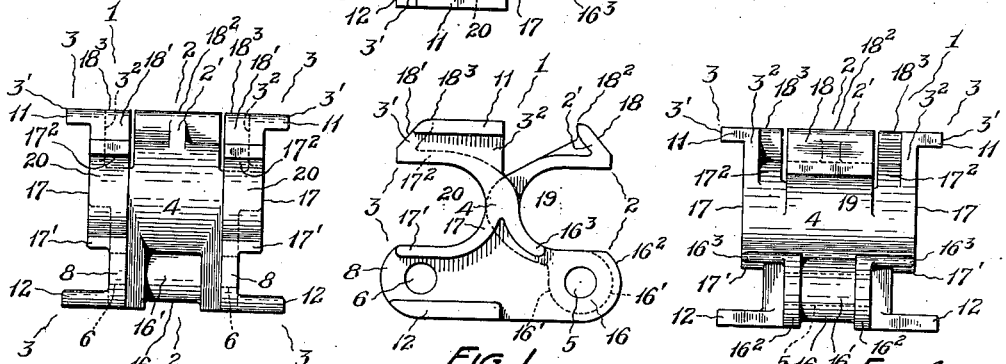
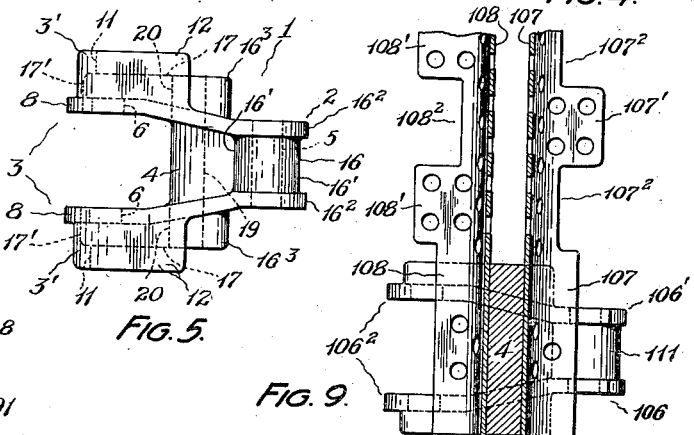
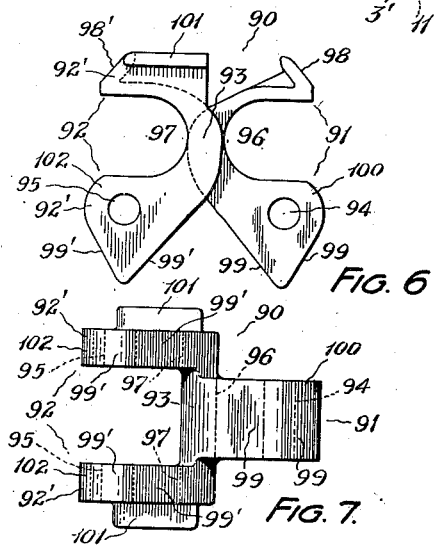
INVENTOR:
FERDINAND H. DALRYMPLE
BY
Saywell and Wesseler
ATTORNEYS

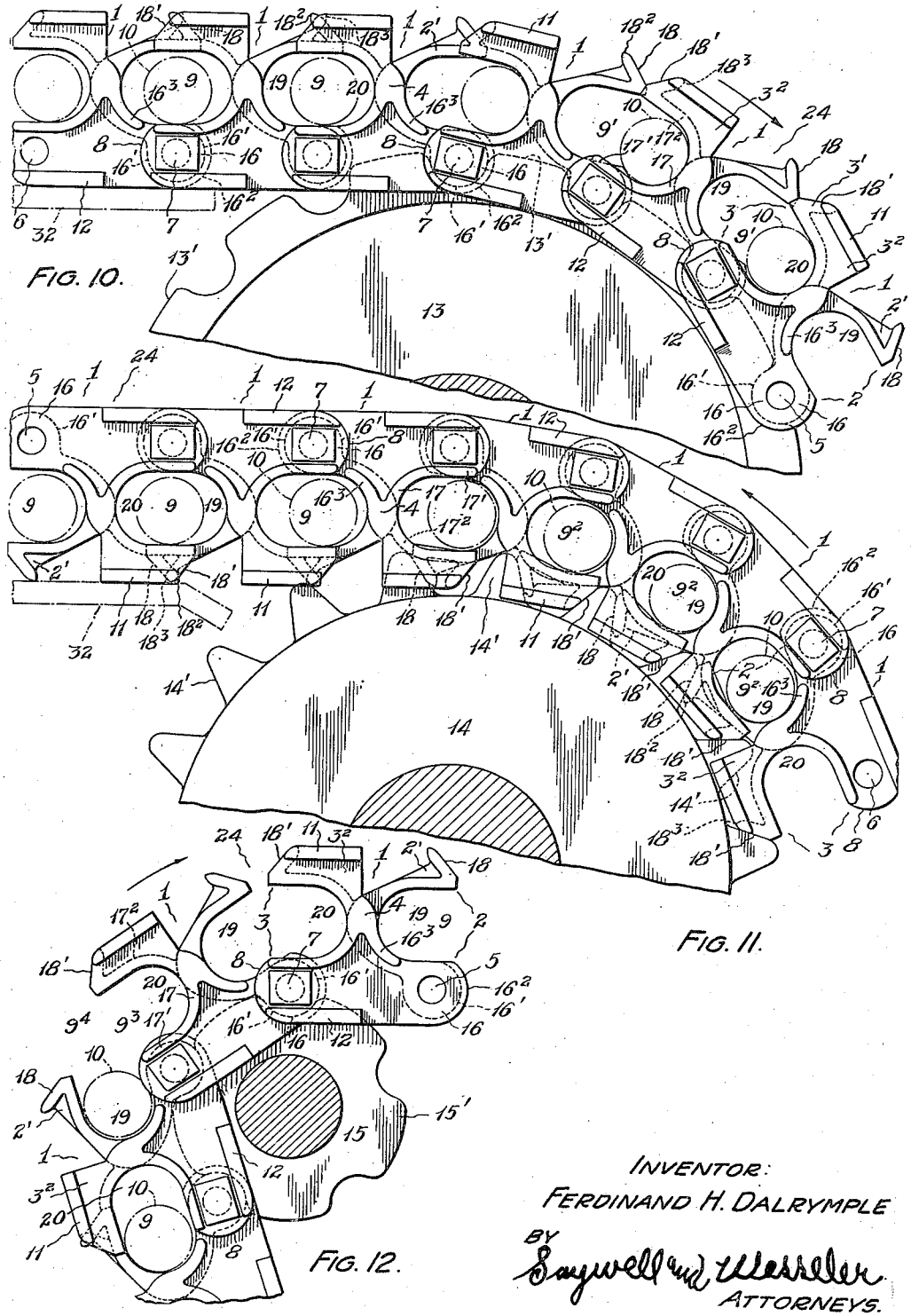

Oct. 10, 1944.   F. H. DALRYMPLE   2,360,209
DUPLEX CHAIN CONVEYER
Filed Dec. 21, 1942    6 Sheets-Sheet 3
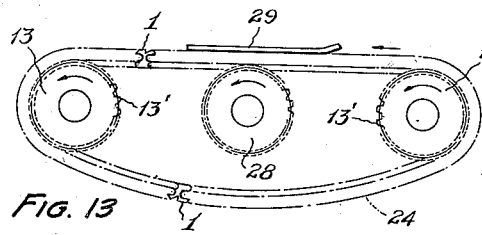
Fig. 13
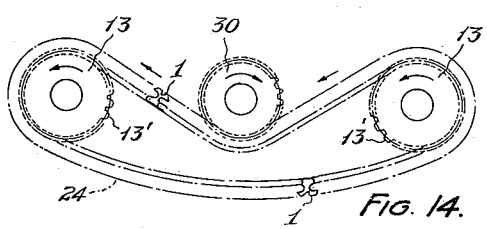
Fig. 14.
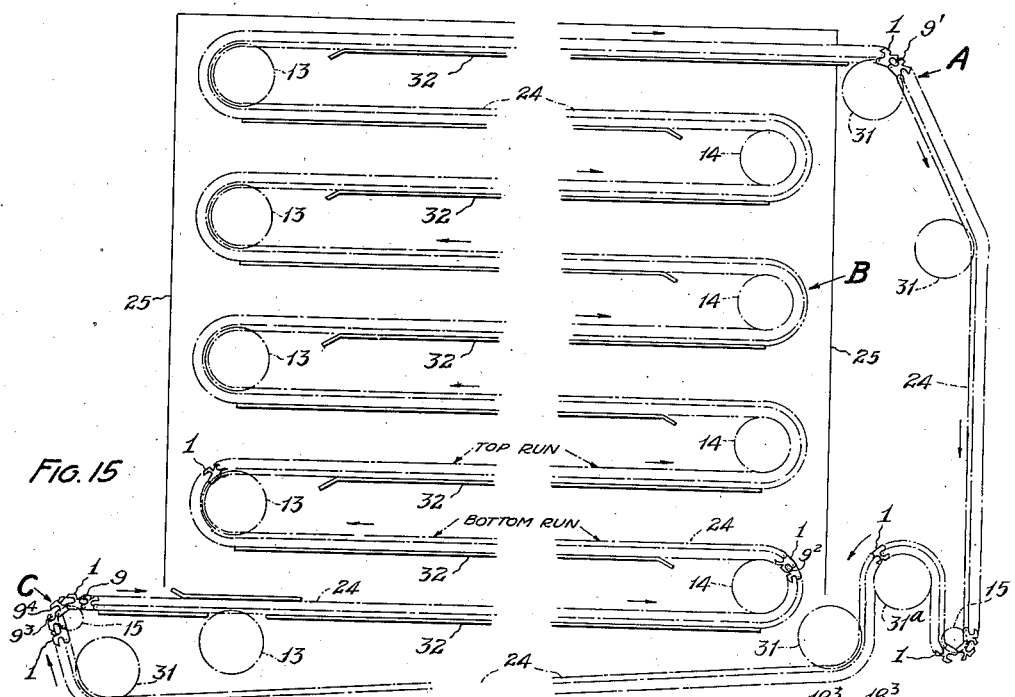
Fig. 15
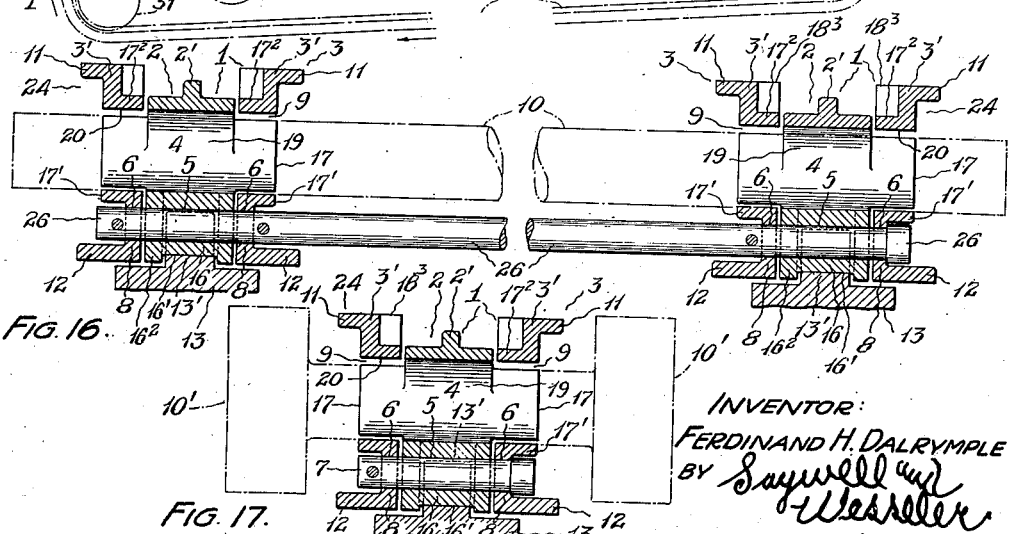
Fig. 16.
Fig. 17.
INVENTOR:
FERDINAND H. DALRYMPLE
BY Saywell and Wesseller
ATTORNEYS.

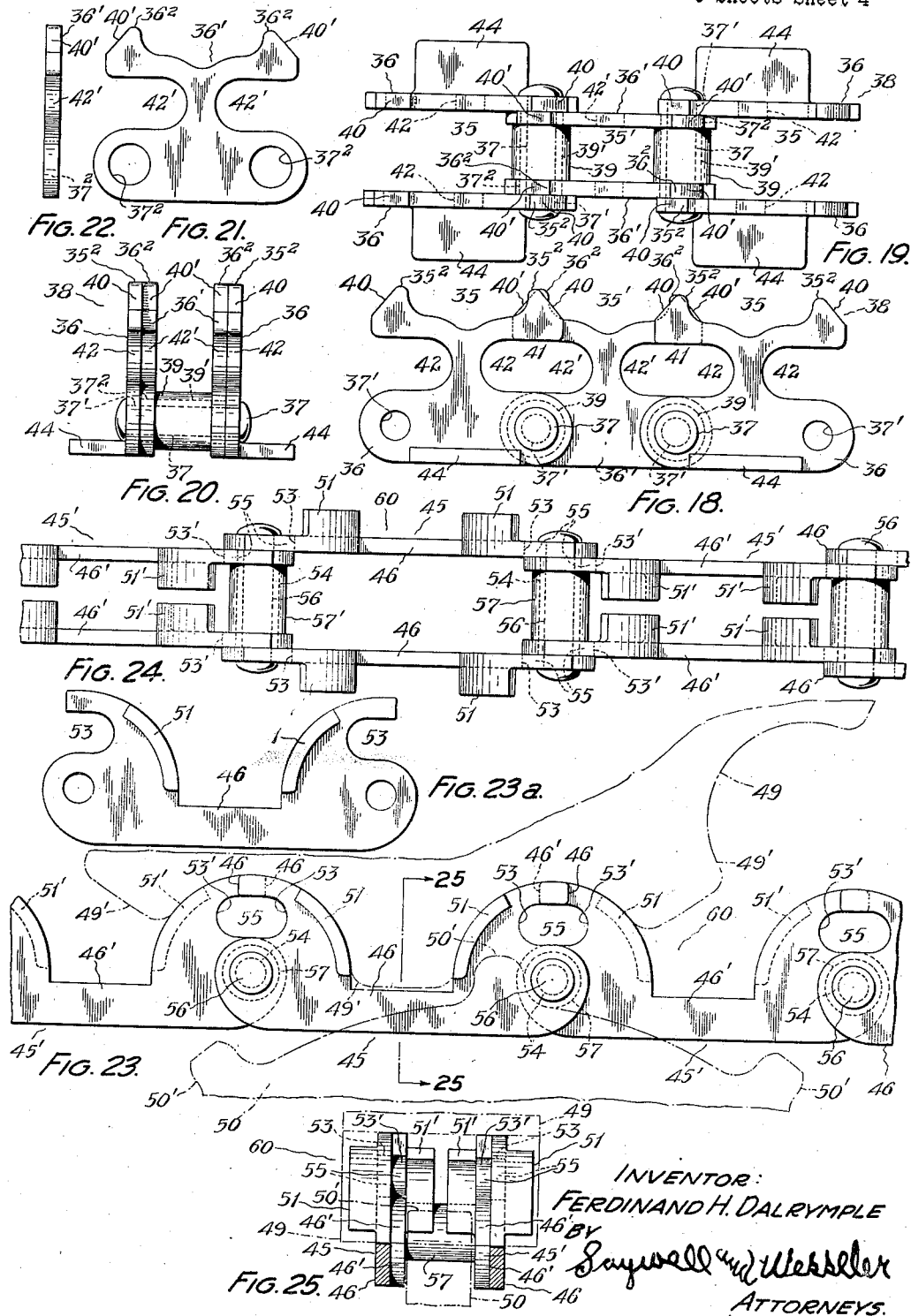

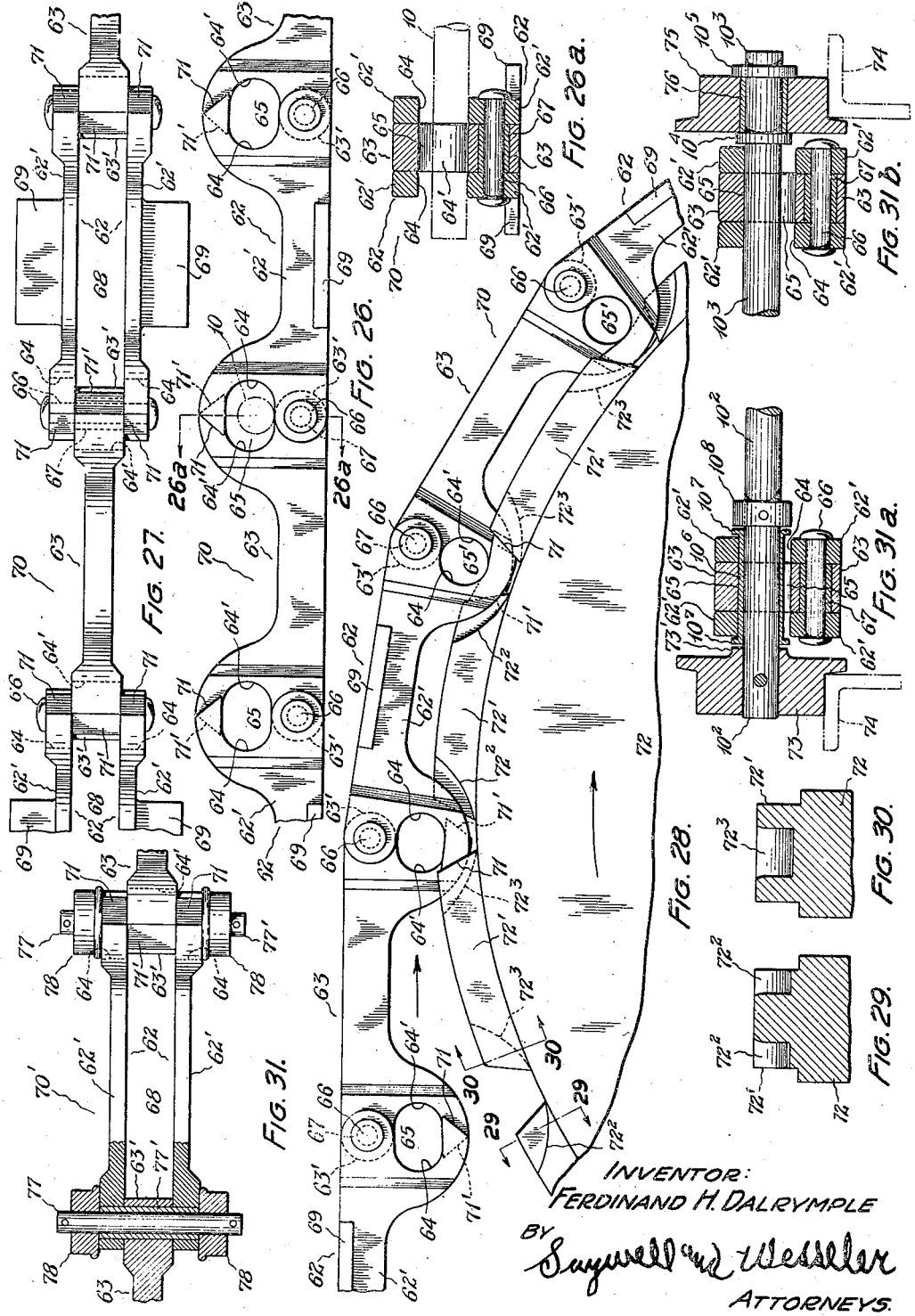

Oct. 10, 1944.          F. H. DALRYMPLE          2,360,209
DUPLEX CHAIN CONVEYER
Filed Dec. 21, 1942          6 Sheets-Sheet 6

INVENTOR:
FERDINAND H. DALRYMPLE
BY
Saywell and Wesseler
ATTORNEYS

Patented Oct. 10, 1944

2,360,209

UNITED STATES PATENT OFFICE 2,360,209

DUPLEX CHAIN CONVEYER

Ferdinand H. Dalrymple, Bedford, Ohio

Application December 21, 1942, Serial No. 469,637

22 Claims. (Cl. 198—189)

The invention relates to duplex chain and particularly to various improved forms thereof which include as an important feature the automatic opening, for reception or discharge, of pockets adapted to receive manually or automatically, the conveyed work or supports for the work, which pockets during the normal conveying and/or processing operations are of such contour as to hold the work or supports therefor without permitting it to fall from or be shifted out of the pockets. The opening and closing work or support pocket is formed between the bodies of the adjacent links of the improved chain and between the two faces of the chain which are adapted for sprocket engagement.

A duplex chain, as set forth herein, is considered to be a chain of the generally accepted type so designated, viz., a chain which will make engagement at opposed faces with cooperating sprockets.

Various forms of the improved chain are shown in the accompanying drawings, and hereinafter described in detail, which illustrate, together with other improved features, the adaptability of the invention to various types of chain and to sprocket engagement therewith, whether the duplex chain is of a standard type for engagement on both sides with cooperating sprockets, or is of the so-called silent or inverted tooth type on both sides for engagement with cooperating sprockets, or is standard for engagement on one side and inverted silent tooth type for engagement on the other side.

By "silent" or "inverted tooth type" chain, or similar expressions herein, is meant the various forms of chain known in the art as suitable for passing over the face of a sprocket like a belt to produce a smooth noiseless action.

The invention includes new and improved forms of links for use in duplex chain. The improved links may be of one-piece construction or assembled from a plurality of pieces. These links may be castings, forgings, or stampings, or a combination thereof.

The annexed drawings and the following description set forth in detail certain means illustrating the improvements in duplex chains, such disclosed means constituting, however, only a few of the many forms in which the principle of the invention may be embodied.

In said annexed drawings:

Figure 1 is a side elevation of a one-piece cast link embodying the invention, this form of link being adapted for standard sprocket engagement on the lower side shown in the figure and for engagement with sprocket teeth of the silent type on its upper side;

Figure 2 is a top plan of the link shown in Figure 1;

Figures 3 and 4 are, respectively, left-hand and right-hand end elevations of the link shown in Figure 1;

Figure 5 is a bottom plan of the link shown in Figure 1;

Figure 6 is a side elevation of a modified form on one-piece cast link adapted for engagement on both sides by silent tooth sprockets;

Figure 7 is a bottom plan of the link shown in Figure 6;

Figure 8 is a side elevation of a link similar to that shown in Figure 1, but modified to the extent rendering it adaptable for association with transverse perforated pan parts which are carried by and between a laterally opposed pair of the links and are suitable for holding a part or a multiplicity of parts to be conveyed and/or processed;

Figure 9 is a fragmentary transverse horizontal section, taken in the plane indicated by the line 9—9, Figure 8;

Figure 37:
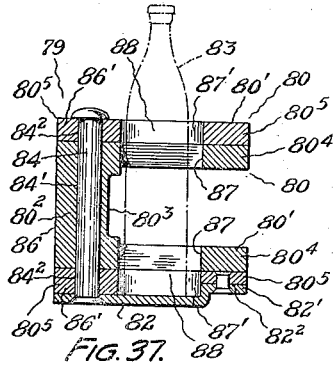
Figure 36:
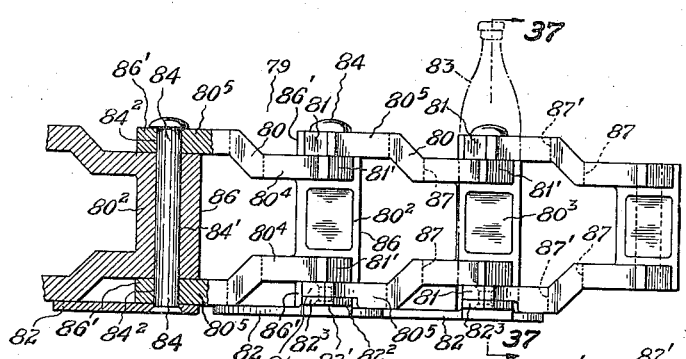
Figures 34, 35:
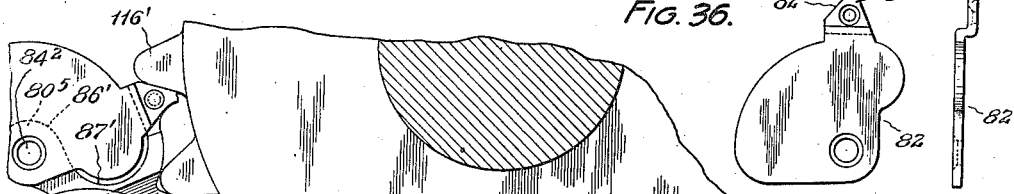
Figures 32, 33, 38, 39:
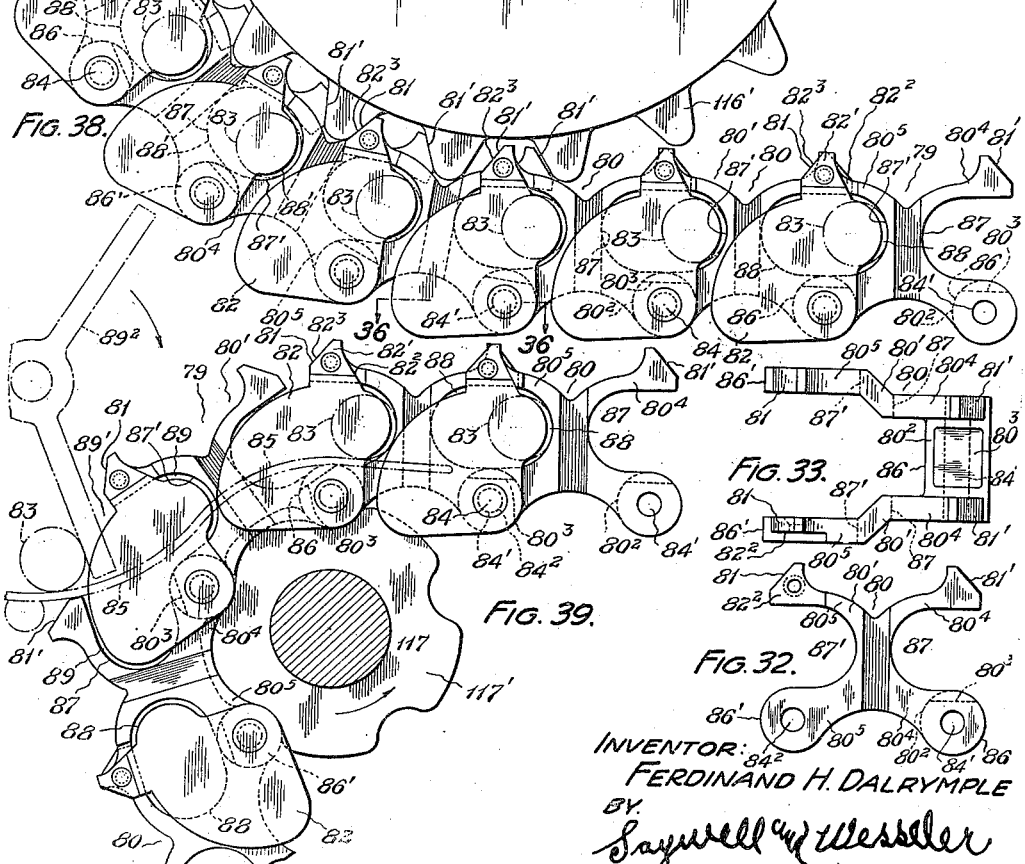

Figure 10 is a fragmentary side elevation of the improved chain, and a driving or idler sprocket therefor, formed from links of the character shown in Figure 1, the view particularly illustrating the engagement of the chain by the bottom side thereof with a standard sprocket, the view, for instance, being an enlarged fragmentary longitudinal elevation of the sprocket and chain engagement indicated by "A", Figure 15;

Figure 11 is a view similar to Figure 10, which illustrates the engagement of the improved chain by the upper side thereof with a silent tooth sprocket, the view, for instance, being an enlarged fragmentary longitudinal elevation of the sprocket and chain engagement indicated by "B," Figure 15;

Figure 12 is a fragmentary side elevation illustrating the automatic opening for reception or discharge of the work, of the load-receiving pockets formed by the links of the improved chain, this opening of the pockets being effected by engagement of the chain with and the passing of the same over a standard sprocket having a comparatively small number of teeth, the view being, for instance, an enlargement of the sprocket and chain engagement indicated by "C," Figure 15;

Figure 13 illustrates a use of the improved chain which includes the driving by the lower side thereof of an auxiliary sprocket;

Figure 14 is a view, similar to Figure 13, in which the driving of an auxiliary sprocket in the opposite direction is effected by the upper side of the chain;

Figure 15 illustrates the use of the improved chain for conveying the work in multiple superposed horizontal banks with sprocket engagement at multiple elevations, the view including automatic opening of the work-supporting pockets for loading and discharge, a housing or oven or like structure in which the conveying and processing is effected being also indicated;

Figure 16 is a fragmentary, broken, transverse, vertical section of two spaced opposed chain strands and standard sprockets engaging the bottom sides thereof, by which chains a common burden is conveyed, opposed pairs of links of the two chain strands being respectively articulately connected by a single rod or pin for both of the pairs;

Figure 17 is a fragmentary, broken, transverse, vertical section of a single chain by which the burden is conveyed, and a standard sprocket engaging the bottom side thereof;

Figure 18 is a fragmentary side elevation of a form of roller chain embodying the invention, but the links of which are assembled from a plurality of separate parts, the links being adapted for normal sprocket engagement at the bottom and silent tooth engagement at the top;

Figure 19 is a top plan of the elements shown in Figure 18;

Figure 20 is an end elevation of the chain shown in Figure 18;

Figure 21 is a side elevation of an inside link element shown in Figures 18, 19, and 20;

Figure 22 is an end elevation of the link element shown in Figure 21;

Figure 23 is a fragmentary side elevation of a chain whose links are formed from a plurality of separate parts and are suitable for engagement both top and bottom with standard sprockets, sprockets having teeth suitable for the purpose being indicated by dot-and-dash lines;

Figure 23a is an elevation of one of the two link elements forming an outside link of the chain shown in Figure 23;

Figure 24 is a top plan of the chain shown in Figure 23;

Figure 25 is a fragmentary transverse section, taken in the plane indicated by the line 25—25, Figure 23;

Figure 26 is a fragmentary side elevation of a modified form of chain embodying the invention, which has a long pitch and is adaptable for engagement at its lower side at alternate pitches with standard sprockets, and for engagement at its upper side at every pitch with silent tooth sprockets;

Figure 26a is a fragmentary transverse vertical section, taken in the plane indicated by the line 26a—26a, Figure 26;

Figure 27 is a top plan of the chain shown in Figure 26;

Figure 28 is a side elevation of the chain shown in Figure 26, illustrating a suitable sprocket with silent tooth formation for engagement with the upper side of the chain as it is shown in Figure 26;

Figures 29 and 30 are fragmentary transverse sections of the sprocket shown in Figure 28, the sections being taken, respectively, in the planes indicated by the lines 29—29 and 30—30, Figure 28;

Figure 31 is a fragmentary top plan of a chain, similar to that shown in Figure 27, but showing the chain reorganized for equipment with outboard rollers, the view being partially in transverse horizontal section;

Figure 31a is a fragmentary transverse vertical section, through the work-supporting pocket, showing a link reorganization suitable for accommodating a rotating work support, in a chain of the character shown in Figures 26 and 27;

Figure 31b is a fragmentary transverse vertical section, through the work-supporting pocket, showing a link reorganization similar to that shown in Figure 31a except that the work support is not rotated, some details being varied from the similar details of Figure 31a to meet the conditions noted;

Figure 32 is a bottom plan of a form of a one-piece link adapted to form a separating conveyor embodying the improvements, the particular chain shown being adaptable for conveyance of bottles, this form of chain having engagement with sprockets rotating about vertical axes instead of horizontal axes;

Figure 33 is a side elevation of the link shown in Figure 32;

Figures 34 and 35 are, respectively, a bottom plan and an end view of a bottle-supporting plate provided for and riveted to each link of the bottle conveyor chain;

Figure 36 is a fragmentary side elevation, partially in longitudinal vertical section, of the bottle conveying chain, the sectional showing being taken in a plane through the hinge pin articulately connecting adjacent links, as indicated by the line 36—36, Figure 38;

Figure 37 is a transverse vertical section, taken in the plane indicated by the line 37—37, Figure 36;

Figure 38 is a fragmentary bottom plan of the bottle-conveying chain, showing a silent tooth sprocket engaging the side of the chain opposite the hinge pin side; and Figure 39 is a bottom plan of the bottle-conveying chain showing the hinge pin side of the same engaged by a standard sprocket having a comparatively small number of teeth, such sprocket engagement of the chain serving to open the work-carrying pocket for loading or discharge of the bottles.

When reference is made herein to a chain or a chain strand having a fixed pitch, it is meant thereby to refer to a connecting of adjacent links by pins or the like with a fixed distance between pin centers so that the chain pitch in such plane or arc is fixed. This fixed pitch, of course, changes to another fixed pitch when the chain wears at the joints, but there is no adjustment or relative change between the pin axes in the plane or arc of the axes as there is between adjustable portions of adjacent links in other planes or arcs which will be hereinafter fully described. It may also well be pointed out that, regarding the change in fixed pitch due to wear at the joints, it is characteristic of silent or inverted tooth chain that the chain shifts outward upon the sprocket teeth concurrently with the wear so as to engage the teeth on a pitch circle of increasing diameter. In other words, the pitch of the sprocket teeth increases at the same rate as the chain pitch.

Referring to the annexed drawings, in which the same elements are designated by the same respective numbers in the several views, and, first, particularly referring to the form of the invention shown in Figures 1-5 and Figures 10-17, a one-piece cast type of chain link 1 consists of a central transversely-extended body portion 4 projected from which are oppositely extended substantially half-elliptical end parts consisting of a single male element 2 extended in one direction substantially midway of the width of the body member 4 and two opposed parts 3¹ extended in the opposite direction adjacent the ends of the body member 4 and forming a female element 3. A chain 24 is formed by articulately connecting a multiplicity of the links 1 with the male element 2 of one link interposed between the female parts 3¹ of another link, and the male and female elements 2 and 3 articulately connected together adjacent the bottom edges of the elements.

The male element 2 and each of the female parts 3¹ forming the female element 3 have significant structural formations which are as follows: The upper part of the male element 2 is a reinforced arm 2¹ whose outer end surface 18 is upwardly and inwardly inclined and forms a bearing surface for engagement with sprocket teeth of the silent type. The bottom part of the male element 2 is a substantially cylindrical formation forming a pin barrel 16 whose longitudinally-opposed surface portions form bearing surfaces 16¹ adapted to be engaged by the teeth of a standard sprocket. The pin barrel 16 is formed with a transverse bore 5. The upper portion of each of the female parts 3¹ is an extended arm 3² whose outer end surface is upwardly and inwardly directed and forms a bearing surface 18¹ adapted for engagement with sprocket teeth of the silent type. The lower portion of each female part 3¹ is a side bar formation 8 having a bore 6, the two bores 6 of the two side bar formations 8 of each link 1 being axially aligned. When two links 1 are assembled, they are articulately connected by a pin 7 passed through the aligned two bores 6 and the bore 5.

When adjacent links 1 are articulately connected together in chain formation 24 and the chain 24 is making a straight run, the overlapping link portions with their adjacent bearing surfaces 18 and 18¹ of the interengaged male part 2¹ and female parts 3² form a substantially isosceles triangular formation, when viewed in side elevation, if shown as in Figures 10 and 11, with the base of the triangle being the top edge of a flange of the upper arm 3² adjacent a bearing surface 18¹ of one link and the sides of the triangle being the outer edge of one of the bearing surfaces 18¹ of the same link, and the bearing surfaces 18 of the other link; and the tips 18² and 18³ of the bearing surfaces 18 and 18¹, respectively, overlapping above or below the triangle, dependent upon whether the lower edge (Figure 10) or the upper edge (Figure 11) of the chain 24 is engaged; the bearing surface 18 being disposed between the bearing surface 18¹ which shows in the drawings, Figures 10 and 11, and the opposed bearing surface 18¹ on the far side.

The substantially half-elliptical male formation 2 forms a recess 19 between its upper and lower parts 2¹ and 16, respectively, and each of the substantially half-elliptical female formations 3¹ forms a recess 20 between its upper arm 3² and its side bar 8. Therefore, when two links 1 are adjacently connected with the male element 2 of one link interposed between the spaced female parts 3¹ of the other link, an opening 9 generally elliptical shaped in longitudinal vertical section, Figures 10 and 11, is formed by the recesses 19 and 20 when the chain 24 is making a straight run.

The pocket 9 serves to carry the work designed to be conveyed or to carry supports for such work. The work and the conveyance and treatment thereof can be of many different characters and is illustrated in Figures 10, 11, 12, and 16 as a rod 10; and in Figure 17 as a special article 10¹. Figure 16 also illustrates the carrying of the work 10 by two parallel spaced chain strands, and Figure 17 illustrates the work 10¹ as carried by a single chain strand.

The links 1 have certain other advantageous structural features as follows: Laterally outwardly-extended from the top and bottom of each of the female parts 3¹ and extending longitudinally inwardly of the links 1 from the tops of the bearing surface portions 18¹, at the top, and from the bottom of the side bar portions 8 at the bottom, are wings or flanges 11 and 12, respectively, which serve as guides and supports for chain travel, in either upright or inverted position, in the channels or other guides through which chains of this character normally pass. The female parts 3¹ of the link 1 are formed with laterally-extended exterior strengthening flanges 17 extending longitudinally from the body member 4 both top and bottom, the lower ends 17¹ of the flanges 17 terminating somewhat above the level of the pin bores 6 and the upper ends 17² of the flanges 17 terminating adjacent the edges of the wings 11. These flanges 17 provide more bearing or carrying area for the work which may be in a moist or soft state, as, for instance, freshly coated work which might be adversely marked by a too restricted carrying area. Also, the top ends of these flanges 17 provide more tooth engaging area when the chain is run in inverted position and they serve as a support for the wings 11 and guide the chain as the bearing surfaces 18¹ enter a sprocket. The lower sides of the flange ends 17¹, together with the upper sides of the wings 12, form suitable shoulders for rotatably fixing the heads of the connecting pins 7.

The male pin barrel part 16 is formed with lateral flanges 16² which extend longitudinally from the top end portions of the barrel 16 around the outside bearing surface 16¹, thus defining the latter, and merge in offset formation into the bottom wings 12. Extending upwardly and inwardly from adjacent the inside top portions of the pin barrel 16 are curved exterior flanges 16³ which merge into the body member 4 and extend laterally to the same extent to which the female flanges 17 are extended. These flanges 16³ form continuous bearing areas. Adjacently inwardly of the upper wings 11 and the contiguous portions of the flanges 17 are the female arm portions 3² which form backings for the bearing surfaces 18¹; in fact, the bearing surfaces 18¹ are formed upon the outside end faces of these arms portions 3² and their flange portions 17².

One of the purposes of the invention is to provide a duplex chain comprised of links of such a structural formation and so assembled that manually or automatically, during the movement of the chain 24, the work may be loaded onto and discharged from the chain 24 by an automatic adjustment of the parts of the links 1 forming the work pocket 9 so as to open the latter. The structure and action of the links 1 are such that the elements forming the pocket 9 will automatically adjust themselves to a contour permitting reception and discharge of work only when the links are engaged by certain sprockets or other certain driving or engaging members, so that the driving or engaging of the chain 24 by members suitable for the normal actuation of the chain will not adjust the contour of the pocket 9 to a degree permitting intentional or accidental insertion or discharge of work into or from said pocket.

Inasmuch as the improved chain is of the duplex character, it can be driven from both sides, and an illustration of a driving thereof by sprocket engagement with the hinged or connecting pin side is shown in Figure 10, and a driving thereof by sprocket engagement with the opposite side is shown in Figure 11. The contour of the work-receiving pocket 9 is varied by the sprocket engagement shown in both Figures 10 and 11, but not so as to permit insertion or discharge of the work 10 through the pocket 9, the character of change in the contour of the pocket 9, by the engagement shown in Figure 10, being indicated by "$9^1$," which it will be noted is an elongation of the pocket short of permitting insertion or discharge of the work 10, and the character of the change of contour of the pocket 9 by sprocket engagement illustrated in Figure 11, being indicated by "$9^2$," which it will be noted is a closing of the pocket toward a less elliptical and more circular form of pocket than the normal contour 9. In Figure 12, however, there is illustrated a pocket contour $9^3$ which is sufficiently expanded to permit insertion or discharge of the work 10 through the pocket opening $9^4$. The chain 24 is there engaged at its hinged side by a standard sprocket 15 having a small number of teeth $15^1$.

It will be evident from the description hereinbefore given, and from the accompanying drawings, that there is a side of the chain 24 which is of fixed overall length, or fixed pitch, viz., the hinged or connecting pin side, and a side of the chain 24 which has relatively automatically adjustable members which vary the contour and function of the work-receiving pocket 9. Whether the pocket 9 is somewhat elongated, as illustrated by "$9^1$," Figure 10, or sufficiently elongated for insertion and discharge of work, as illustrated by "$9^3$," Figure 12, depends upon an engagement of the chain 24 with a sprocket at its hinged side whereby relatively to increase the distance through which the opposite side must travel, and whether the pocket 9 is contracted, as illustrated by "$9^2$," Figure 11, depends upon an engagement of the chain 24 with a sprocket at its side opposite the hinged or fixed side, whereby relatively to decrease the distance through which such engaging side must travel as compared with the distance of travel of the hinged or fixed side.

When the engagement of the links of the chain 24 with a sprocket is at the hinged or fixed side of the chain, as illustrated in Figure 10, the sprocket 13 is of a character having standard type of teeth $13^1$, and the engagement of these teeth $13^1$ is with the bearing surfaces $16^1$ of the pin barrel 16 at the bottom of the male elements 2 of links 1 of the character shown in Figure 1, and the effect upon the upper adjustable and overlapping parts of the cooperating male and female elements of adjacent links is to move the upper tip portions $18^2$ and $18^3$ further apart and thus gradually eliminate the triangular formation hereinbefore referred to, as clearly seen in the central portion of the chain segment, Figure 10, until the bottom portions of the bearing surfaces 18 and $18^1$ are substantially aligned with each other in a transverse direction and appear in side elevation to substantially abut each other as shown at the right-hand side of Figure 10, thus gradually effecting an increased contour of the normal sized pocket 9 to a dimension indicated by "$9^1$." The increased size of the pocket $9^1$ is not sufficient, however, to allow discharge of the work 10 from the pocket.

When the sprocket engagement is with the bottom side of the links 1 shown in Figure 1, as illustrated by engagement of a sprocket 14, Figure 11, with the links 1 of the chain 24, the tip portions $18^2$ and $18^3$ of the male and female elements 2 and 3 of the link 1 move toward each other, as the sprocket teeth engage the link bearing surfaces, thus gradually decreasing the normal sized contour of the pocket 9, these tip portions passing each other and gradually pulling away from each other as the chain progresses around the sprocket, until the pocket assumes the contour illustrated by $9^2$, right-hand side of Figure 11, which approaches a pocket of circular cross-section rather than the generally elliptical formation of the normal pocket 9. In either direction of chain travel, when engaged at the adjustable side by a sprocket 14 having the silent type of teeth $14^1$, as shown in Figure 11, the sprocket teeth $14^1$ concurrently engage both the bearing surfaces $18^1$ of the outer female parts $3^1$ of one link 1 and the intermediate bearing surface 18 of the male element 2 of an adjacent link 1. Inasmuch as chain and sprocket engagement of this nature decreases the size of the normal pocket 9, it is evident that no action takes place which would permit intentional or accidental removal of the work 10 from the pocket.

When the chain 24 is engaged on the hinged side by the teeth $15^1$ of a small sprocket 15, or a sprocket with a small number of teeth, Figure 12, the differential between the distance travelled by the hinged or engaging said of the chain 24 and the distance necessarily travelled by the adjustable side thereof is so great as to effect a spreading of the cooperating male and female elements of adjacent links sufficient to elongate the pocket 9 to a contour such as "$9^3$," which completely opens the pocket 9 and provides a passage $9^4$ large enough to permit the passing therethrough of the work 10.

The improved duplex chain operates equally well in either direction on both its top and bottom surfaces and may be engaged both top and bottom by standard type of sprocket teeth, or both top and bottom by the so-called silent type of sprocket teeth, or may be engaged at one side by standard teeth and at the other side by silent teeth. As hereinbefore stated, the form of chain shown in Figures 10 and 11 is engaged on the hinged or bottom side by standard type of teeth, and on the opposite or top side by silent teeth. In Figures 6 and 7, a form of one-piece link 90 is shown, adaptable for engagement with sprocket teeth of the silent type upon both top and bottom sides. This link 90 is comprised of the central male element 91 extended longitudinally outwardly in one direction from the central portion of the body 93, and the spaced opposed parts $92^1$ forming a female element 92 extended longitudinally outwardly in the opposite direction in straight line formation from the two sides of the body 93, both the male and female elements being of curved formation providing a recess 96 interiorly of the male element 91 and recesses 97 interiorly of the female parts $92^1$. The lower ends of the male element 91 and the female parts $92^1$ are formed into blocks or ears 100 and 102, respectively, which are provided with pin bores 94 and 95, respectively, and which are sharply downwardly tapered so as to provide a contour suitable for engagement with sprocket teeth of the silent type. The links 90 are assembled to form a strand of chain by passing the male element 91 in between the opposed female parts $92^1$ to bring a male pin bore 94 into alignment with female pin bores 95 whereby to form a closed open-ended pocket of the recesses 96 and 97 for support of the work or work-carrying member. The outer end of the male element 91 is formed with an upper bearing surface 98, and lower bearing surfaces 99 on the ear 100, and the outer ends of the female parts $92^1$ are formed with upper bearing surfaces $98^1$ and lower bearing surfaces $99^1$. The upper portions of the female parts $92^1$ are formed with outwardly-extended lateral wings 101 for engagement with the channel in which this type of chain usually runs, when the chain formed from a multiplicity of links 90 is running in an inverted position. When the chain is running with the links 90 thereof in the upright position shown in Figures 6 and 7, the wings 101 serve as means upon which to hang the chain. It will be noted that the provision of the bearing surfaces 99 and $99^1$ upon the outer ends of lower elongated and tapered portions of the male element 91 and the female parts $92^1$, respectively, of the character shown, provide for driving this type of chain on the hinged side by a sprocket having teeth of the silent type, as well as permitting driving by the same type of teeth upon the opposed side which has the respective bearing surfaces 98 and $98^1$.

Referring to the form of the invention shown in Figures 8 and 9, the link formation 106 is similar to the formation of the link 1 shown in Figure 1, except that this link 106 is an adaptation of the invention to the carrying of a partially closed-end perforated pan by two or more parallel chains, in which pan may be carried the article or a multiplicity of articles to be heated or otherwise treated as they are conveyed. For this purpose, a transverse pan part 107 of trough formation is secured to the male parts $106^1$ of transversely opposed links 106 and a similar pan part 108 secured to the female parts $106^2$ of such links, the open sides of the pan parts 107 and 108 of adjacent links being longitudinally opposed and somewhat spaced apart to form a downwardly tapered opening therebetween, during a normal straight run of the chains. Longitudinally extended in one direction from the top and bottom of the pan part 107 are transversely spaced and outwardly-extended lips $107^1$ which form alternate recesses $107^2$ between adjacent lips. Likewise, outwardly extended in the opposite direction from the top and bottom of the pan part 108 are spaced lips $108^1$ which form alternate recesses $108^2$, the lips $107^1$ being longitudinally opposed to the recesses $108^2$, and the lips $108^1$ being longitudinally opposed to the recesses $107^2$. Therefore, when one link 106 is assembled with an adjacent similar link with the male part $106^1$ thereof passed into and between the female parts $106^2$ of the adjacent link, the lips $107^1$ of the pan part 107 secured to the link male element $106^1$ pass into the recesses $108^2$ of the pan part 108 secured to the female parts $106^2$ of the adjacent link, while the lips $108^1$ of the pan part 108 will pass into the recesses $107^2$ of the pan part 107 of still a third link 106. Thus a practically closed pan is formed between adjacent links 106, which pan serves as a receptacle for the article or articles to be processed. The construction is such that when the chain formed from the links 106 is engaged at its bottom side by standard sprockets, the adjustable sides of the links, due to the interspacing of the lips and recesses, are not spread far enough apart to release the articles from the receptacle. Of course, when the upper sides of the links 106 are sprocket engaged, the pan parts are brought into even closer proximity than for normal running. However, when the adjustable sides of the links 106 are expanded to the extent shown in Figure 12, the male element $106^1$ of one link, and the female parts $106^2$ of the adjacent link, are separated to an extent hereinbefore explained relative to Figure 12, and the pan parts 107 and 108 of adjacent links 106 are respectively turned in opposite directions relatively with their respective link parts sufficiently to permit loading or discharge of the articles into or out of the pan. The bearing surfaces of the link 106 for engagement by a sprocket having the silent type of teeth are indicated in Figure 8 by "109" for the upper male bearing surface, and by "$109^1$" for the upper female bearing surfaces. The lower bearing surfaces for engagement with standard sprockets are indicated by "111."

Referring to Figures 13 and 14, a use of the improved duplex chain as a transmission medium, as well as a conveying medium, is indicated diagrammatically. Endless strands of chains 24 are engaged by two sprockets 13 having standard form of teeth $13^1$. In Figure 13 an auxiliary sprocket 28 is driven by the hinged side of the chain 24, this auxiliary sprocket 28 having also standard type of teeth, and in Figure 14 the driving of an auxiliary sprocket 30 having silent type teeth is effected by the adjustable side of the chain links. These auxiliary sprockets 28 and 30 are thus driven for the purpose of taking supplemental rotational work off the shafts to which the auxiliary sprockets 28 and 30 are secured, the driven shafts being turned in the same or in the opposite direction, as desired, to that in which the chain-driving sprockets turn. There is also indicated in Figure 13 a guide plate 29 for confining the chain to the sprocket 28.

There is illustrated diagrammatically in Figure 15 the path of an endless chain 24 of this improved type which is run as a horizontal loop conveyer at different levels through a processing chamber, a heating oven 25, for instance; the links 1 of the chain 24 functioning automatically due to their engagement with certain sprockets 15 to permit loading and discharge of the work to and from the chain 24, thus eliminating the necessity of work-transfers. Starting at the loading station indicated by "C" in the lower left-hand side of the view (see also enlarged view of this loading station in Figure 12), it will be noted that the adjustable sides of the links 1 have been opened sufficiently by engagement of the hinged side thereof with a sprocket 15 to permit the feeding or installation of the work through the opening $9^4$ into the pockets $9^3$, and thence the links 1, Figure 15, with the work, proceed on a normal run with pockets of the character of "9," Figure 10, into the right-hand lower side of the oven 25, the chain 24 first passing over a drive sprocket 13 and thence at the opposite side of the oven 25 around either a driving or idler sprocket 14 which engages the adjustable side of the links 1 to form work-supporting pockets $9^2$ of the character shown in Figure 11, whence the chain 24 passes in succession and alternately, bottom runs or bottom side up and top runs or right side up, around sprockets 13 and 14, and finally passes out of the oven at its upper right-hand side and is engaged at its hinged side by an idler sprocket 31, forming pockets $9^1$ of the character shown in Figure 10, whence it passes downwardly over an idler 31, the links 1 being opened at the bottom and right side of the view for automatic discharge of the work by the engagement of the lower side thereof with a sprocket 15 having a comparatively small number of teeth. Thence the chain 24 engages an idler $31a$ by its adjustable side, and then another idler 31 by its hinged side at the lower right-hand side of the view, and then a take-up idler 31 by its hinged side at the lower left-hand side of the view, whence the chain 24 passes to the loading station C. As noted, support and guide channels 32 are provided for that side of the chain 24 which is the lower side at the respective levels.

It will be well understood by those versed in the art that with the use of the chain, shown in Figure 15, as a vertical loop conveyer the sliding wings 11 and 12 on the female element 3 of the links 1 would have no utility and could be omitted.

The adaptation of the improved chain shown in Figure 15 permits the building of very compact processing units, resulting in the use of less floor space and, oftentimes, in the use of less heat and other processing media.

Referring to Figure 16, there is shown the conveying of work, in the form of rods 10, by two parallel strands of chain 24, the chains being comprised of links 1 of the character shown in Figure 1, and being driven, as illustrated in this particular view, at their hinged sides by sprockets 13 having standard teeth $13^1$ of the character shown in Figure 10, the articulate connecting of opposed pairs of adjacent links 1 of these two chains 24 being effected by a common transverse rod or pin 26 the two ends of which are journalled in the aligned bores 5 and 6 of the opposed pairs of links 1 forming the two chains 24, such a through rod or pin giving the conveyer additional stability.

Figure 17 illustrates the conveying of the work $10^1$ for the desired treatment by means of a single strand of chain formed of the improved links 1.

Referring to the form of chain shown in Figures 18-22, a chain 38 is formed of outside links 35 alternated with inside links $35^1$, of which each link comprises a pair of opposed members, "36" for the outside link and "$36^1$" for the inside link. These links 35 and $35^1$ are of the straight bar type and overlap at their ends, with the link members $36^1$ positioned flush with and interiorly of the link members 36, and are articulately connected together by connecting pins 37 which pass through axially aligned bores $37^1$ and $37^2$ of the respective members 36 and $36^1$, transverse bushings $39^1$ being locked in the inner link members $36^1$ interiorly of the outer link members 36, and rollers 39 being mounted upon the bushings $39^1$ interiorly of the inner link members $36^1$. The link members 36 and $36^1$ have opposed curved oppositely and longitudinally directed arms thus forming end recesses 42 and $42^1$, respectively. The upper parts of the end faces of the members 36 of the links 35 are formed with inwardly and upwardly directed bearing surfaces 40. Likewise, the end faces of the upper portions of the members $36^1$ of the links $35^1$ have bearing surfaces $40^1$. When the inner links $35^1$ and the outer links 35 are assembled on the pins 37, the respective extreme upper tips $35^2$ and $36^2$ of the links 35 and $35^1$ adjacent the bearing surfaces 40 and $40^1$ overlap, as indicated in Figure 18, and an open-ended closed work-supporting pocket 41 is formed between adjacent links. The articulate connecting of the links 35 and $35^1$ is effected adjacent the lower end of the links so that a sprocket having standard type of teeth will engage the lower portions of the opposite sides of the rollers 39 for driving the chain 38, causing the adjacent tips $35^2$ and $36^2$ to move in opposite directions away from each other to form an enlarged work-receiving pocket. If the sprocket has a comparatively small number of teeth, the separation of the tips $35^2$ and $36^2$ will be sufficient to open the pocket 41 for insertion or discharge of the work. When the chain is driven from its side opposite the hinged side, the driving is effected upon the bearing surfaces 40 and $40^1$ of the link members 36 and $36^1$, and when the links are actually in engagement with the sprocket, the overlapping tips $35^2$ and $36^2$ thereof will be moved past each other and then away from each other to reduce the size of the pocket 41. The lower ends of the outside link members 36 are formed with laterally and outwardly directed wings 44 which serve as guides when the chain 38 is run in upright position, as shown in Figure 18, these wings serving as members from which the chain 38 may depend when the chain is running in inverted position.

Referring to the form of invention shown in Figures 23, 23a, 24, and 25, a type of link is therein illustrated for engagement at both sides of the chain with sprockets having a normal type of tooth. This link is also of the straight bar type, and the chain 60 formed thereby is comprised of opposed pairs of outside links 45 alternated with inside links $45^1$, articulately connected together adjacent their lower sides by pins 56 upon which are mounted, interiorly of the bars 46 of the outer links 45, bushings 54 locked in the inner link members $46^1$, rollers 57 being mounted upon the bushings 54 between the bars $46^1$ of the inner links $45^1$. The driving engagement at the lower and hinged side of the chain 60 is effected by widely spaced teeth $50^1$ of a sprocket 50 of the contour shown in Figures 23 and 25 which engage the rollers 57. The teeth $50^1$ of the sprocket 50 are of a standard type, as also are the widely spaced broad and deep teeth $49^1$ of a sprocket 49 which engages the side of the chain 60 opposite the hinged side thereof. For the last-mentioned driving engagement, the upper part of each member 46 of the outer link 45 is formed adjacent its two ends with a pair of opposed laterally outwardly-extended bearing wings 51 for sprocket teeth, and each member $46^1$ of the inner links $45^1$ with a pair of inwardly-extended bearing wings $51^1$ for sprocket teeth formed upon and adjacent its two ends. The upper end portions of the members 46 and $46^1$ are of curved formation and form longitudinally-directed recesses 53 and $53^1$, respectively, and overlap with similar plates of the respectively adjacent links, so that when the links 45 and $45^1$ are assembled, a complete open-ended work-supporting pocket 55 is formed between each two adjacent links. When the chain 60 is engaged from its hinged side by the teeth 50¹ of the sprocket 50, the pocket portions 53 and 53¹ are spread farther apart to increase the contour of the pocket 55 and, if the chain 60 is engaged by a sprocket of comparatively small number of teeth, the pocket 55 is completely opened for insertion or discharge of the work. If the links 45 and 45¹ are engaged on the opposed side at the bearing wing portions 51 and 51¹ by the teeth 49¹ of the sprocket 49, the pocket portions 53 and 53¹ are contracted to decrease the contour of the pocket 55.

Referring to the form of the invention shown in Figures 26-30, the chain 70 is formed of outside links 62 alternated with inside links 63, of which the links 62 each comprises opposed bars 62¹ and the link 63 is a single bar. These links 62 and 63 are articulately connected adjacent the bottom by pins 66 to form the complete chain 70, bushings 67 being locked in the link 63 on the pins 66 between the members 62¹ of the links 62. A chain assembled from such links is designed to be driven from the bottom or hinged side by a sprocket having standard type of teeth, but driven thereby only every alternate pitch. This driving is effected through the opening 68 between the members 62¹ of the link 62 by engagement of the sprocket teeth with the lower end surfaces 63¹ of the links 63. The form of chain 70 is the straight side bar type and is one having a long pitch, and it is designed to be driven on the side opposite the hinged side at every pitch by a sprocket 72 having a novel form of long teeth 72¹. For this purpose, the upper ends of the link members 62¹ are formed with inclined bearing surfaces 71 at their extreme upper ends and these bearing surfaces overlap with oppositely-inclined bearing surfaces 71¹ formed at the upper ends of the inside links 63. The teeth 72¹ of the sprocket 72 are cut differentially similarly to the cooperative engaging portions of the links 62 and 63 and are wide enough to span both bearing surfaces of the opposed link members 62¹. These sprocket teeth 72¹ are formed with outer central surface recesses 72³, Figure 30, to enable the teeth 72¹ to pass the ends of inside links 63 and with opposed side clearance areas 72², Figure 29, to clear the ends of the link members 62¹. Also, the link members 62¹ and 63 are formed with outwardly-directed recesses 64 and 64¹, respectively, which, when the links 62 and 63 are assembled, form a complete laterally open pocket 65 in adjacent and overlapping ends of the links 62 and 63. When the chain 70 is engaged by the sprocket 72, as described, the pocket 65 assumes a substantially circular outline 65¹, Figure 28. The pocket 65 is increased in contour by engagement with a sprocket upon the hinged side of the chain 70. Thus, when the chain 70 is engaged by a sprocket of a small number of teeth, the overlapping surfaces forming the pocket 65 are opened sufficiently to permit insertion and discharge of the work. Laterally extended from the side members 62¹ forming the link 62 are opposed wings 69 forming support or guide members for the chain 70 in the trough in which the chain 70 customarily travels, when the chain 70 is running in upright position, as shown in Figure 26. When the chain 70 is running in inverted position, the wings 69 serve as means from which the chain may depend.

In Figure 31, the aforementioned articulate connection of the adjacent links is modified to the extent of utilizing connecting pins 77 and bushings 77¹ of extended length and mounting outboard rollers 78 upon the ends of the pin 77 for use in lieu of the wings 69 shown in Figure 27. The chain 70¹ is supported by the outboard rollers 78 in both the upright and inverted running positions.

The work-supporting pockets in both Figures 26 and 31, as also, in Figures 31a and 31b, hereinafter described, are small relative to the chain pitch, so these pockets 65 are located adjacent the ends of the overlapping links 62 and 63.

Referring to the form of the invention shown in Figure 31a, the same includes outside chain link members 62¹ and an inside link 63, similar to the chain assembly shown in Figures 26, 26a and 27, but a special adaptation of the work support, as a part of the chain, is illustrated in Figure 31a. The work support 10² extends laterally of two or more strands of chain through the work-supporting pockets 65 and is provided at its ends with flanged rollers 73 fixedly secured to the work support 10² and engaging a track 74, whereby the work supported by the member 10² may be rotated as it is conveyed and processed. Flanged bushings 10⁶ having flanges 10⁷ are locked in the recessed ends of the links 63. The rollers 73 are formed with shouldered hubs 73¹ projected inwardly from their flanged face portions and are held by lock collars 10⁸. The work support 10² with the rollers 73 also serves in lieu of laterally extended wings.

Referring to the form of the invention shown in Figure 31b, the same is quite similar to that shown in Figure 31a in that a work support 10³ is extended transversely between and through two or more strands of chain having outside link members 62¹ and inside links 63 similar to those shown in Figures 26 and 27, but the assembly shown in Figure 31b includes flanged end rollers 75 rotatably mounted upon the work support 10³, whereby the work support is conveyed and the work thereon processed without rotating the latter through the medium of the work support. The flanged roller 75 engages track 74 and pressed or locked therein is a bushing 76 in turn mounted upon the work support 10³ between a support shoulder 10⁴ and a lock collar 10⁵. The work support 10³ with the rollers 75 also serves in lieu of laterally extended wings.

Referring to the form of the invention shown in Figures 32-39, the chain embodying the invention is shown as engageable by sprockets rotating on vertical axes, and is so organized as to be particularly adaptable for use as a separating conveyer, i. e., for spacing articles in a vertical position. For illustration, bottles are shown as the particular articles that are spaced. The chain 79 is comprised of articulated links 80, one of which is shown in Figures 32 and 33. One lateral side of the link 80 is designed for engagement with a sprocket having its axis vertically positioned and having standard type teeth, and the opposite lateral side is designed for engagement with a sprocket having a vertical axis of rotation and formed with silent type of teeth, such as sprocket 116, Figure 38.

The link 80 has upper and lower arms 80¹ which are offset at one end into portions 80⁴ which enclose a vertical space which is more shallow than the space between the opposed opposite end portions 80⁵ of the link 80. The offset link portions 80⁴ of one link are designed to lie flush adjacently interiorly of the inner faces of the more widely spaced link portions 80⁵ of an adjacent link when the links are assembled into chain formation. At one side of the link 80 the narrowed portion is a single member which extends completely across the dimension of the narrow end of the link to form a pin barrel $80^2$ having a pin bore $84^1$, which pin barrel $80^2$, when two links 80 are adjacently assembled, fits between the more widely separated portions $80^5$ of the adjacent link 80 upon the same side, which more widely separated portions $80^5$ of the link are formed with pin bores $84^2$ which are aligned with the bores $84^1$ whereby a connecting pin 84 is accommodated, articulately to connect the adjacent links. The pin barrel $80^2$ is formed with bearing surfaces 86 for engagement with sprocket teeth and the more widely separated link portions $80^5$ upon the same side formed with ears $86^1$. The widely separated members $80^5$ of the link upon the opposite side are formed with inwardly and upwardly inclined end bearing surfaces 81, and the less widely separated portions $80^4$ of the link upon that side are formed with inwardly and upwardly inclined end bearing surfaces $81^1$.

Figure 36 shows an assembly of several such links 80 to form a strand of chain 79 suitable as a conveyer for bottles 83. These bottles 83 are accommodated in a pocket 88 formed by recesses 87 in the narrow end of one link and recesses $87^1$ in the wide end of an adjacent link. The contour of this pocket 88 is varied by sprocket engagement of the chain 79, being contracted, as illustrated by $88^1$, when the chain 79 is engaged on the adjustable side by a sprocket having the silent type of teeth $116^1$, such as sprocket 116, Figure 38, and being expanded when the chain 79 is engaged on the hinged side by a sprocket having standard type teeth. When the hinged side of the chain 79 is engaged by a sprocket such as 117, Figure 39, having a comparatively small number of teeth $117^1$, the pocket 88 is expanded to an extent indicated by "89" which provides a discharge opening $89^1$ for the bottles 83 and an opening through which bottles may be fed to the conveyer.

In order to provide for the seating of the bottles 83 in the chain 79, a plate 82, Figures 34 and 35, which slides upon the base or guide for the chain 79, is riveted at one side to the wide part $80^5$ of one side of the link 80 by means of a raised portion $82^1$ of the plate, the lower part of the plate 82 being riveted at the opposite side by the connecting pin 84 to the wide part $80^5$ of the opposite side of the link 80, as clearly shown in Figure 37. The side of the wide end of the link 80 to which the plate offset part $82^1$ is designed to be secured is formed with a recess $82^2$ within which the plate offset $82^1$ is seated. The offset $82^1$ of the plate 82 is formed with an end surface portion $82^3$ which lies in alignment with a bearing surface 81. The bottles 83 are individually held in the pockets 88 between the overlapping link arms at the two sides of the adjacent links, and danger of breakage, scuffing, and other bottle damage is eliminated.

In order that the bottles 83 may be moved toward the opening $89^1$ when it is desired to automatically discharge them, as shown in Figure 39, a cam arm 85 is suitably mounted in any desired manner adjacently exteriorly of the mouth $89^1$ and passes through the various adjacent bottle pockets 88, which cam arm will progressively move the bottles 83 toward the opening portions of the links 80 as the chain 79 moves toward the unloading station. Provision is made for proper disposition of this cam arm 85 by removing a portion from the inside of the pin barrels $80^2$, as indicated by $80^3$, Figures 32, 33, 37, and 39. When the bottles 83 have reached a point adjacent the mouth $89^1$ they are swept therethrough by any suitable means entering the link, such as wheel arms $89^2$, the space between the offset portions $80^4$ of the link 80 being sufficiently wide for this purpose.

What I claim is:

1. A duplex chain link comprising opposed outside link bars and overlapping opposed inside link bars whose overlapping portions are articulately connected together adjacent one sprocket-engaging face, the outer ends of said bars adjacent said sprocket-engaging face being formed for articulate connection respectively with adjacent links, the inner ends of said bars adjacent their overlapping portions and adjacent the opposed sprocket-engaging face being formed for such last-mentioned sprocket engagement, the outer ends of said bars adjacent the last-mentioned sprocket-engaging face being also formed for sprocket engagement and for overlapping relation with the outer ends respectively of adjacent links, the bodies of the respective bars being formed at each end from elements defining open-ended recesses between the engaging faces, whereby, when the link is articulately connected with adjacent links to form a chain strand having a fixed pitch, with the recess elements of the adjacent bars in opposed relation and in relatively movable assembly to form work-receiving pockets, the sizes of the pockets are changed as the direction of chain run is changed.

2. A duplex chain link characterized as in claim 1 in which laterally-extended wings are provided adjacent one face of the link to serve as guides when a chain assembled from a multiplicity of the links is positioned for sprocket engagement at one face and to serve as chain supports when the chain is positioned for sprocket engagement at the opposed face.

3. A duplex chain link characterized as in claim 1 in which the bars each comprise end formations defining outwardly-opening recesses formed for overlapping assembly with adjacent similar links, said formations having tooth bearing-surfaces interiorly of the recesses and a tooth-accommodating socket between said surfaces, the tooth bearing-surfaces on the outside link bars being in opposed relation and outwardly laterally extended and the tooth bearing-surfaces on the inside link bars being in opposed relation and inwardly laterally extended.

4. A duplex chain comprised of a multiplicity of articulated links characterized as in claim 1 but in which the inside link is a single bar for sprocket engagement every alternate pitch at one face of the chain and at every pitch at the opposed chain face.

5. A duplex chain comprised of a multiplicity of articulated links characterized as in claim 1 but in which the inside link is a single bar for sprocket engagement every alternate pitch at one face of the chain and at every pitch at the opposed chain face, and in which the articulate connection is effected by pins having extended ends upon which are mounted outboard supporting rollers.

6. A conveyer comprising a plurality of parallel chains each having a plurality of articulated links of the character set forth in claim 1 and in which work-supports are passed through the pockets of opposed link bars of parallel chains and extend transversely across and between parallel chains and have their ends extended laterally outwardly from the outer chains, wheels being mounted on said extended ends of the work-supports.

7. A duplex chain link of a separating conveyer comprising a one-piece formation having at one end a male element and at the opposed end a female element adapted to enclose the male element of a similar adjacent link, the male and female elements being formed adjacent one face for articulate connection with respective adjacent similar links to form a chain strand having a fixed pitch, the link being formed with sprocket-engaging surfaces adjacent its two opposed faces, the male and female elements of the link between said faces each defining an open-ended recess, whereby, when the link is articulately connected with adjacent links to form a chain strand with the adjacent recesses in opposed relation to form work-retaining pockets, the size of the pockets is changed as the direction of chain run is changed and a work-support extended across the pocket between the sprocket-engaging faces of the link.

8. A link of a separating conveyer comprising opposed bars having inwardly offset side formations at one end, a pin barrel connecting the offset formations adjacent one face of the link, the other ends of the bars adjacent said link face being formed into barrel-engaging ears, the offset end formations and the pin barrel connecting the same being adapted for accommodation between said "other ends" of a similar link for articulate connection of the links through the pin barrels to form a chain strand having a fixed pitch, the construction being such that a work-retaining pocket is formed between the adjacent links intermediate the pin barrel and the overlapping ends of the links adjacent the opposite face, the link being formed for sprocket engagement on the pin barrel surfaces and for sprocket engagement on the opposite face upon both ends, whereby, when the link is articulately connected through its pin barrel and ears to adjacent links to form a chain strand, the size of the work-retaining pocket is changed as the direction of chain run is changed, and a work-support extended across the pocket area between the sprocket-engaging faces of the link.

9. A duplex chain link having opposed sprocket-engaging faces and formed for articulate connection with an adjacent similar link to form a chain strand having a fixed pitch, the body of the link being formed between its articulating axis and a sprocket-engaging face with an open-ended recess directed longitudinally of the chain strand, whereby, when the link is articulately connected with another link, with the recesses of the adjacent links opposed and reversely arranged to form a work-receiving pocket, the size of the pocket is changed as the direction of chain run is changed.

10. A duplex chain link of a separating conveyer characterized as in claim 9 in which a work-support is extended across the pocket between the sprocket-engaging faces of the link.

11. A duplex chain link having opposed sprocket-engaging faces and formed for articulate connection adjacent one face with an adjacent similar link to form a chain strand having a fixed pitch, the body of the link being formed between its articulating axis and the opposite face with an open-ended recess directed longitudinally of the chain strand, whereby, when the link is articulately connected with another link, with the recesses of the adjacent links opposed and reversely arranged to form a work-receiving pocket, the size of the pocket is changed as the direction of chain run is changed.

12. A duplex chain link formed for articulate connection thereof with an adjacent similar link to form a chain strand having a fixed pitch, said link having a surface adjacent one face for engagement with sprockets having a standard tooth formation and a surface adjacent the opposed face for engagement with sprockets having silent type teeth, the body of the link forming a work-engaging element between its articulating axis and a sprocket-engaging surface, the work-engaging element being adapted in conjunction with a like element of a similar link to form a work-retaining member whereby, when the direction of chain run is changed, the relative positions of the work-engaging elements of the work-retaining member formed by the adjacent links are changed.

13. A duplex chain link formed for articulate connection thereof adjacent one face with an adjacent similar link to form a chain strand having a fixed pitch, said link having a surface adjacent said one face for engagement with sprockets having a standard tooth formation and having a surface adjacent the opposed face for engagement with sprockets having silent type teeth, the body of the link forming a work-engaging element between its articulating axis and said "opposed" link face, the work-engaging element being adapted in conjunction with a like element of a similar link to form a work-retaining member whereby, when the direction of chain run is changed, the relative positions of the work-engaging elements of the work-retaining member formed by the adjacent links are changed.

14. A one-piece duplex chain link having opposed sprocket-engaging faces and formed for articulate connection with an adjacent similar link to form a chain strand having a fixed pitch, the body of the link being formed with an element between its articulating axis and a sprocket-engaging face which defines a recess having an open end, the walls of the recess being such that opposed reversely arranged recesses of similar adjacent links will form a work-receiving pocket whose walls overlap, whereby the pivoting of the links of a chain strand on their articulating axes, as the direction of chain run is changed, changes the size of the work-receiving pocket.

15. A one-piece duplex chain link characterized as in claim 14 in which the recess element is of flanged formation providing additional work-bearing surface.

16. A one-piece duplex chain link having opposed sprocket-engaging faces and formed upon one end with a male element and upon the opposite end with a female element adapted to enclose the male element of a similar adjacent link, the male and female elements being formed adjacent one face for articulate connection with respective adjacent similar links to form a chain strand having a fixed pitch, the male and female elements of the link between the opposed sprocket-engaging faces of the latter each defining an open-ended recess whereby, when the link is articulately connected with adjacent links to form a chain strand with the adjacent recesses in opposed relation to form work-receiving pockets, the size of the pockets is changed when the direction of chain run is changed.

17. A one-piece duplex chain link characterized as in claim 14 in which the opposed link faces are each adapted for engagement with sprockets having a silent type of tooth.

18. A conveyer comprising a plurality of parallel chains each having a plurality of articulated links of the character set forth in claim 14 and in which work-receptacles extend transversely across and between parallel chains and are secured to the laterally opposed links of the latter and are mounted in the pocket recesses of said opposed links.

19. A conveyer comprising a plurality of parallel chains each having a plurality of articulated links of the character set forth in claim 14 in which the articulate connection of the respectively transversely opposed links of the several chains is effected by a common connecting pin extended transversely across the conveyer from chain to chain.

20. A one-piece duplex chain link characterized as in claim 16 in which the female element is formed top and bottom with outwardly-extended guides.

21. A one-piece duplex chain link characterized as in claim 16 in which both male and female elements are of flanged formation providing additional work-bearing surface for the work-receiving pocket formed by the opposed recesses, and in which the female element is formed top and bottom with outwardly-extended guides, and in which the guide adjacent the articulating face together with the adjacent female flanged formation provide a lock for link connecting means.

22. A duplex chain link comprising four identical link bars, one pair of which are outside bars and the other pair of which are inside bars, the bars of each pair being transversely spaced, an end of each bar of each pair overlapping the opposite end of a bar of the other pair, the bars being formed adjacent one sprocket-engaging face and adjacent each end for articulating pins, whereby to provide adjacent said face for sprocket engagement and for a fixed pitch, the bars being further formed adjacent the opposed sprocket-engaging face and adjacent each end with sprocket-engaging surfaces, the bars being further formed between their articulating axes and said last-mentioned sprocket-engaging face with open-ended recesses directed longitudinally of the link, whereby, when the link is articulately connected with adjacent links to form a chain strand, with the recess elements of the adjacent bars in opposed relation to form work-receiving pockets, the size of the pockets is changed as the direction of chain run is changed.

FERDINAND H. DALRYMPLE.